United States Patent [19]

Atterby et al.

[11] Patent Number: 4,667,910
[45] Date of Patent: May 26, 1987

[54] DEVICES FOR SUSPENSION OF OBJECTS

[76] Inventors: Fred G. V. Atterby; Mikael Atterby; Adam Atterby, all of Revviken, 181, 90 Lidingo, Sweden

[21] Appl. No.: 808,937

[22] Filed: Dec. 13, 1985

Related U.S. Application Data

[63] Continuation-in-part of Ser. No. 504,278, Jun. 14, 1983, abandoned.

[30] Foreign Application Priority Data

Jun. 17, 1982 [SE] Sweden ............................ 8203765
May 18, 1983 [SE] Sweden ............................ 8302293

[51] Int. Cl.4 ............................................. F16B 45/00
[52] U.S. Cl. ....................................... 248/71; 24/453; 411/446
[58] Field of Search ............. 248/71, 69, 216.1, 216.4, 248/218.1, 218.2, 218.3; 174/164, 168–170; 24/293–296, 573, 336, 458, 457, 453; 411/446, 450–451, 456

[56] References Cited

U.S. PATENT DOCUMENTS

| 306,719 | 10/1884 | Clark | 174/164 |
|---|---|---|---|
| 514,222 | 2/1894 | Hall | 248/216.1 |
| 1,109,568 | 9/1914 | Flagge | 248/71 |
| 1,474,835 | 11/1923 | Hogan | 248/71 |
| 1,606,786 | 11/1926 | Hogan | 248/71 |
| 1,943,261 | 1/1934 | Knutson | 248/71 |
| 2,150,258 | 3/1939 | Woodings | 411/446 |
| 2,471,584 | 5/1949 | Richards | 248/71 |
| 2,963,125 | 12/1960 | Finneburgh | 403/209 |
| 2,964,814 | 12/1960 | Parkin | 24/293 |
| 3,224,047 | 12/1965 | Horton | 24/293 |
| 3,547,392 | 12/1970 | Tanzer | 248/360 |
| 3,981,471 | 9/1976 | Currier | 248/317 |
| 4,444,372 | 4/1984 | Klingstedt | 411/15 |

FOREIGN PATENT DOCUMENTS

| 849438 | 7/1952 | Fed. Rep. of Germany | 248/71 |
|---|---|---|---|
| 967270 | 3/1950 | France | 248/216.1 |
| 817766 | 8/1959 | United Kingdom | 24/295 |
| 1034679 | 6/1966 | United Kingdom | 24/295 |
| 1344588 | 1/1974 | United Kingdom | 248/360 |

Primary Examiner—J. Franklin Foss
Assistant Examiner—Robert A. Olson
Attorney, Agent, or Firm—Abelman Frayne Rezac & Schwab

[57] ABSTRACT

A fastening device for insertion into a hole in a support member has an axially straight shank having a width substantially in the range of 85–95% of the hole diameter, and an axially straight barb connected with the shank through a minor radius, such that the barb and shank can move into closely adjacent parallelism with each other when the fastener is inserted into a hole and the barb is in a flexed and stressed condition, the barb having a length in the range of 90–140% of the hole diameter, and, in its unstressed condition, subtending an acute angle of 30°–45° with respect to the shank.

2 Claims, 6 Drawing Figures

DEVICES FOR SUSPENSION OF OBJECTS

This application is a continuation-in-part of Ser. No. 504,278, filed June 14, 1983, now abandoned.

The present invention relates to devices for suspension and/or fastening of objects of different types in a roof, on a wall or other surfaces, e.g. electrical cables, tubes of different kinds, false inner-roofs, lamps, paintings and similar objects.

For the above-mentioned purposes there are numerous different types of devices available from the simple nail, which can be inserted in a wooden wall, to more sophisticated devices such as expansion-shell bolts and similar. For walls of mortar and brick can, for light loads, narrow nails of hardened steel be used, often in combination with a plastic piece wherein the nails are embedded and which is formed so as to have a suspension hook. For walls of concrete and similar very hard materials hardened steel nails cannot be used and for such materials it will be necessary to bore a hole which then is plugged with a plug of plastic or wood wherein a screw or a threaded hook is inserted with the use of the thread so as to expand the plug.

For roofs of other materials than wood it is, of course, not possible to use nails of any kind since objects suspended therewith exert a pulling force in the length direction of the nail. The same is true for fastening devices threaded in plugs inserted in holes. For this purpose it has been necessary to use the effective but expensive fastening devices of the expansion-shell bolt type.

Cables and tubes of smaller dimensions are usually fastened to wall surfaces and similar with the aid of clamps of plate or plastic which envelop the cable or the tube, which in their turn are fastened towards the surface with a nail, when so is possible, or with the aid of a screw and a plug inserted in a hole bored in the surface. Such fastening devices thus consist of two or three parts which is expensive as regards materials and especially with a view to the work consumption for the fastening.

According to the present invention the above-mentioned considerable disadvantages are avoided and fastening devices are achieved which per se comprise also means for their fastening to a surface in a hole bored therein, the fastening being possible without the aid of tools and solely with the aid of a pressure by the hand. The fastening devices according to the invention are cheap and give an astonishingly strong attachment in all commonly occuring types of wall and roof materials comprising board, wood, mortar, brick, tiles and concrete.

The fastening devices according to the invention are suitably made from either hard-rolled relatively thin steel bands which only require bending to the form intended according to the invention, or alternatively of soft carbon steel bands which after bending and forming require hardening and annealing. It is preferred to manufacture the fastening devices from hard-rolled bands of stainless steel, i.e. bands of spring quality. Other types of springy metal bands can also be used.

Preferred embodiments of the fastening devices according to the invention are shown in the enclosed drawings, wherein.

Figure 1:
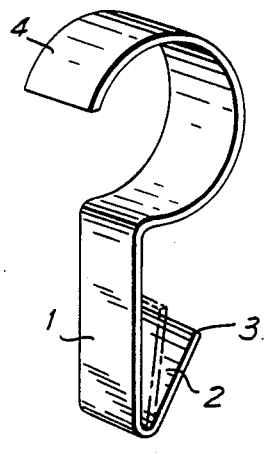
FIG. 1 and FIG. 2 show in perspective fastening devices in the form of clamps intended for attaching round cables and tubes to wall surfaces.

All of the above-mentioned fastening devices according to the invention consist of a straight shank part 1, one end of which is acutely, i.e. with a very small radius, bent back towards the shank to the formation of a straight barb part 2, the angle of which in relation to the shank being within the range of about 30°–45°. The sharp corners 3 of the barb engage flexibly into the wall of the bored hole after the introduction of the shank into the hole. The other end of the shank is provided with means for suspension or fastening of objects such as tubes, round or flat cables, false inner-roofs, lamps, pictures and similar.

The devices for suspension or fastening the objects can comprise different embodiments which are elucidated in the drawing FIGS. 1-3, 4-6. All specific embodiments of the fastening device according to the invention have the above-mentioned shank part 1 and the barb part 2, which has sharp corners 3 which, as mentioned above, engage against the wall of the hole after the introduction of the shank therein so as to attach the fastening device securely in the hole. The dimensioning of the hole diameter, the band width, the band thickness, the length of the barb in relation to the band width and other parameters of importance for the best function of the fastening device are further defined below.

Figure 2:
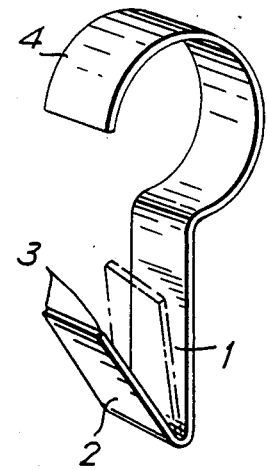

Accordingly, FIGS. 1 and 2 elucidate preferred embodiments of a fastening device according to the invention for fastening of round cables or round tubes. Both of these embodiments are similar but in the embodiment according to FIG. 1 the part of the band enclosing the cable has been bent in a direction from the shank to the formation of an angle of about 90°, whereafter the band encloses the circumference of the cable or the tube to an extent of about ¾ thereof. The barb is in this case bent in the same direction as the part enclosing the cable or the tube.

FIG. 2 shows a fastening device similar to the one shown in FIG. 1 but in this case the barb is bent from the shank in an opposite direction in relation to the embodiment in FIG. 1. In this case the angle between the shank and the beginning of the part enclosing the cable or the tube is lesser than 90°. The design according to FIG. 1 makes the part of band enclosing the cable or the tube longer so that a pressure or a hit against the outermost part of the band enclosing the tube or the cable will be directly transferred to the length direction of the shank when the tube or the cable is present therein so that a much lesser flexibility is obtained in relation to the embodiment shown in FIG. 2. The embodiment shown in FIG. 1 is especially suitable for stiffly springing clamp, e.g. for water tubes since, as mentioned above, a pressure or a hit on the upper part of the clamp after the introduction of the cable or the tube into the clamp is directly transferred to the shank 1. The clamp according to FIG. 2 is especially suitable for clamps for electric cables of smaller dimensions.

Figure 3:
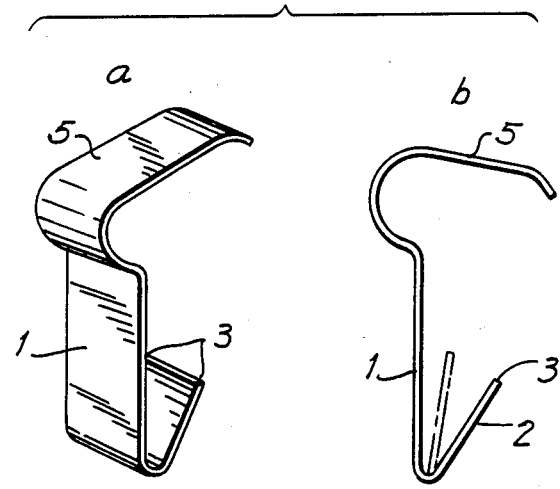
FIG. 3 shows in perspective a clamp for fastening of socalled flat cables.

FIG. 3 shows a fastening device according to the invention in the form of a clamp for flat cables and in this embodiment the angle between the plane part of the enveloping part 5 of the band and the shank 1 somewhat lesser than 90° which angle when mounting the clamp in the hole is straightened to 90° so that the cable will be kept at a pressure towards the surface upon which it is attached.

When mounting water-bearing tubes it is of importance that the tube does not lay in direct contact with the wall surface in view of the risk that water condensed on the tubes be transferred to the wall surface and for such use it is suitable to arrange a distance washer 9 between the wall and the tube on the shank part 1, said washer having a suitable height such as 5-15 mms. Such a washer can optionally be designed with a recess fitting the hole in the wall and which acts as a guide which keeps the clamp in location. Also, the advantage is gained that the hole is completely covered.

In the embodiments of the fastening device according to FIGS. 1 and 2 the part of the band enclosing the cable or the tube should be extended around the circumference thereof to about ¾ which ensures a secure attachment. In this manner it will also be possible to use the flexibility of the material so that a clamp having certain dimensions can be used for fastening of cables or tubes with a certain diameter range so that the number of different sizes of the clamps can be diminished.

Figure 4:
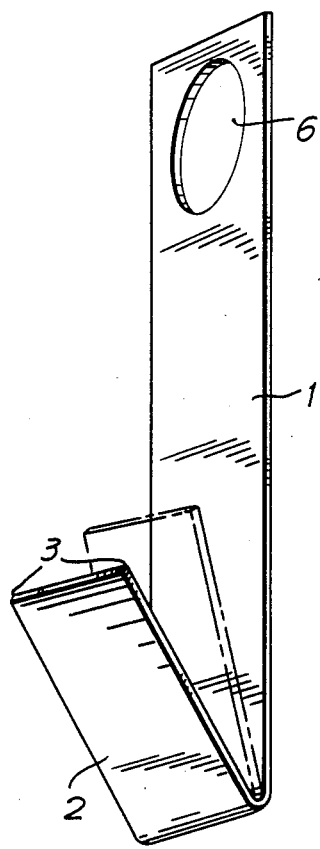
FIG. 4 shows in perspective a fastening device according to the invention intended to take pulling forces.

FIG. 4 in the drawings shows a fastening device according to the invention intended to take up pulling forces. This device has, as the other embodiments, a shank part 1 which in the outer end is provided with a hole 6 intended for fastening the object to be suspended or in general for taking up a pulling force in the lengthwise direction of the shank. The other end of the shank has as the other embodiments a barb 2 with sharp corners 3 which engage in the wall of the bored hole.

Figure 5:
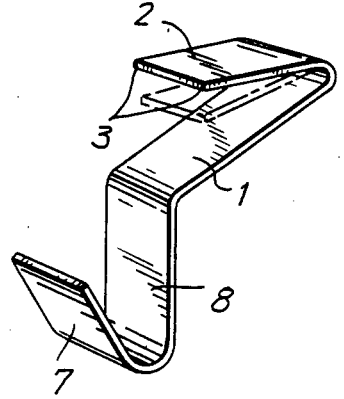
FIGS. 5 and 6 show a fastening device according to the invention adapted for suspension of objects on a wall.
Figure 6:
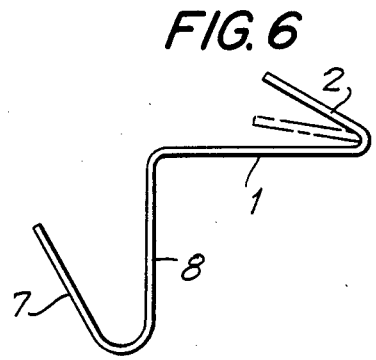

FIGS. 5 and 6 shows a fastening device according to the invention adapted for suspension of objects on a wall surface. In this embodiment the band outsides of the shank part has been bent 90° in a direction from the barb to the formation of a band part 8 running downwards from the hole, which part 8 at a minor distance from the hole again is bent upwards to the formation of a hook 7 upon which objects can be suspended. This embodiment is intended to take up loads or pulling forces in a direction which is essentially perpendicular to the length axis of the hole bored in the wall.

The fastening devices according to the invention are, as mentioned above, introduced into a hole bored in a wall surface or a roof surface with the barb first and the device is then inserted by pressing with the hand or with a simple tool such as a screw driver located in the angle between the shank and the barb so that the barb is bent towards the shank and after the introduction in the hole the two corners 3 will flexingly engage the wall of the hole. The means 4, 5, 6 and 7 for suspension or fastening of the objects are, of course, kept outside of the opening of the hole.

The fastening strength is not required to be especially great for fastening cables or tubes, i.e. for the embodiments according to FIGS. 1-3. However, practical tests have shown that the fastening strength achieved with the devices according to the invention considerably surpasses the one obtained with presently used conventional types of clamps intended for use on walls of bricks or concrete. The same is true as regards the embodiment of the fastening device shown in FIG. 6 in which the load from the hook 7 is transferred to the shank 1 which will rest against the wall surface of the hole. In this case it is obvious that the dimensioning of the barb is of a lesser critical importance since this embodiment of the fastening device according to the invention when loaded is not submitted to any considerable force in the lengthwise direction of the hole. It is further obvious that the maximum load that the hook 7 of the device can support depends on the stiffness of the band against the rightening force of the load to which the hook is submitted and of the ability of the wall material to take this load. The former can be increased by increasing the thickness and the hardness of the band whereas the latter in practice is always sufficient for all commonly occuring loads.

FIG. 6 shows the fastening device according to FIG. 5 seen from the side.

For manufacturing of the fastening devices according to the invention it is as mentioned above preferred to use hard-rolled band of stainless steel. The hardness thereof is suitably 45-50 HRC or 1400-1700 N. It is also possible to use band material of carbon steel of the commercial quality 1778 (0.7% carbon) which after the manufacturing must be hardened and annealed, the latter suitably also to a hardness within the range 45-50 HRC, preferably about 48 HRC.

The preferred range for the angle between the shank and the barb is about 30°-45°, the lower part of this range being especially suitable for fastening devices for which the pulling force in the lenghtwise direction of the shank is relatively small, viz. fastening devices according to FIGS. 1-3 and 7, whereas the upper part of the range is especially suitable for fastening devices for which the pulling force in the lengthwise direction of the shank is great, viz. fastening devices according to FIG. 6.

The preferred range for the band width is 75-95% of the diameter of the hole into which the devices are to be introduced especially 85-95% for maximum pulling strength and the length of the barb is suitably 90-140% of the diameter of the hole.

It is obvious that a combination of a small barb angle (to the shank), a small band width in relation to the hole diameter and a long barb length within the ranges stated makes it easier to introduce the device into the hole and this combination of parameters is especially suitable for fastening devices according to FIGS. 1-3 and 5. It is further obvious that a great barb angle, a wide band width and a short barb length (within the ranges stated) are especially suitable for fastening devices according to FIG. 4. The length of the shank shall of course always be adapted as needed in each individual case so that the barb will engage in the intended material, e.g. in concrete or brick when the surface is finished with gipsum or mortar.

A last parameter for controlling the fastening strength of the device is the band thickness which suitably is about 1/7-1/15 of the band width.

An important property of the fastening devices according to the invention are that they, as mentioned above, can be easily inserted into a hole with an easy pressure by the fingers for smaller clamps or for more heavy devices by a pressure with the hand on the outer part of the device or by putting an ordinary screw driver in the angle between the barb and the shank whereupon they with an easy hit by the hand on the handle of the screw driver can be driven into the hole. It is further of importance that the fastening devices according to the invention can be loosened from the hole with the use of a pointed object which is introduced in the hole so as to engage the end of the barb between its corners so that the barb is bent towards the shank so that the device can be pulled out. In case too small band widthes are used this property will be lost.

As an example of the fastening strength of a device according to FIG. 4 it may be mentioned that such a device made from hard-rolled stainless steel with a hardness of 1600 N (Sandvik ®12 R11), a band width of 6.2 mms, a thickness of 0.5 mms, a barb angle of 42° and a barb length of 9 mms introduced into a hole with a diameter of 7 mms bored in common brick (which is a relatively soft-brittle material), lost its grip therein at first at a pulling force of 158 kgs. In comparison therewith it may be mentioned that a conventional hook threaded into a plastic plug inserted in a hole (6 mms) in agreement with the manufacturer's instructions lost its grip already at a pulling force of 9.5 kgs.

It is obvious that the recommendations given above for the dimensioning of the fastening devices according to the invention can be varied in numerous ways for fulfilling specific requirements; further, the basic inventive thought of the invention can be used by obvious modifications of the specific forms shown. Such modifications shall fall within the scope of the invention.

We claim:

1. A fastening device, in combination with a support member having a cylindrical bore, said fastening device being formed from spring metal strip that has one end thereof reversely bent to provide a shank and a barb, said one end of the fastening device being for insertion into said cylindrical bore of said support member, the other end of said strip being appropriately formed for it to embrace a member to be supported, the improvement comprising:
    said strip having a width in the range of 85-95% of the diameter of said cylindrical bore;
    said barb being axially straight, substantially planar, and having substantially parallel side edges, the length of said barb, at least at its side edges, being in the range of 90-140% of the diameter of said cylindrical bore;
    said shank being axially straight, substantially planar, and having substantially parallel side edges, the length of said shank being substantially in excess of the length of said barb;
    said barb terminating at its opposite outer edges in sharp-edged corners for biting engagement in the juxtaposed wall of said cylindrical bore, and, before insertion into said cylindrical bore, subtending an acute included angle substantially in the range of 30°-45° with respect to said shank;
    the bend between said shank and said barb being of small radius in order to permit said barb to move towards closely adjacent parallelism with said shank when said fastening device is inserted into said cylindrical bore.

2. The fastening device of claim 1, in which the thickness of said shank and barb is within the range of 1/7-1/15 of the width of said band.

* * * * *